(12) United States Patent
Palin et al.

(10) Patent No.: US 7,600,430 B2
(45) Date of Patent: Oct. 13, 2009

(54) DEVICE FOR ARRANGING THE MEASUREMENT OF PRESSURE IN A WRISTOP INSTRUMENT

(75) Inventors: Henrik Palin, Helsinki (FI); Erik Lindman, Esbo (FI)

(73) Assignee: Suunto Oy, Vantaa (FI)

( * ) Notice: Subject to any disclaimer, the term of this patent is extended or adjusted under 35 U.S.C. 154(b) by 165 days.

(21) Appl. No.: 11/605,288

(22) Filed: Nov. 29, 2006

(65) Prior Publication Data

US 2007/0121424 A1    May 31, 2007

(30) Foreign Application Priority Data

Nov. 30, 2005    (FI) ................... 20051224

(51) Int. Cl.
*G01L 7/00* (2006.01)
(52) U.S. Cl. .......................................... 73/700; 368/11
(58) Field of Classification Search ................ 73/700; 368/11
See application file for complete search history.

(56) References Cited

U.S. PATENT DOCUMENTS

| | | | | |
|---|---|---|---|---|
| 2,986,038 A | * | 5/1961 | Cerny | 73/715 |
| 4,107,996 A | * | 8/1978 | Hollingsworth et al. | 73/300 |
| 4,783,772 A | * | 11/1988 | Umemoto et al. | 368/11 |
| 5,500,835 A | | 3/1996 | Born | |
| 6,016,102 A | * | 1/2000 | Fortune et al. | 340/442 |
| 6,219,304 B1 | | 4/2001 | Mignot et al. | |
| 2004/0160859 A1 | | 8/2004 | Germiquet et al. | |

FOREIGN PATENT DOCUMENTS

| | | |
|---|---|---|
| DE | 10222165 | 11/2003 |
| DE | 10222165 A1 | 11/2003 |
| EP | 0769734 | 4/1997 |
| EP | 0769734 A2 | 4/1997 |

* cited by examiner

*Primary Examiner*—Andre J Allen
(74) *Attorney, Agent, or Firm*—Birch, Stewart, Kolasch, Birch LLP

(57) ABSTRACT

A device for the measurement of external pressure in a wristop instrument, such as a sports computer, a diving computer, a wristwatch, or the like, which includes an instrument body,—at least one watertight space disposed inside the instrument body, and at least one circuit board situated and a pressure sensor disposed in the watertight space. A flow path extends through the instrument body to the watertight space and this flow path is closed by a membrane, which is permeable by a gas, but not by water, and which closes the flow path in a watertight manner.

14 Claims, 1 Drawing Sheet

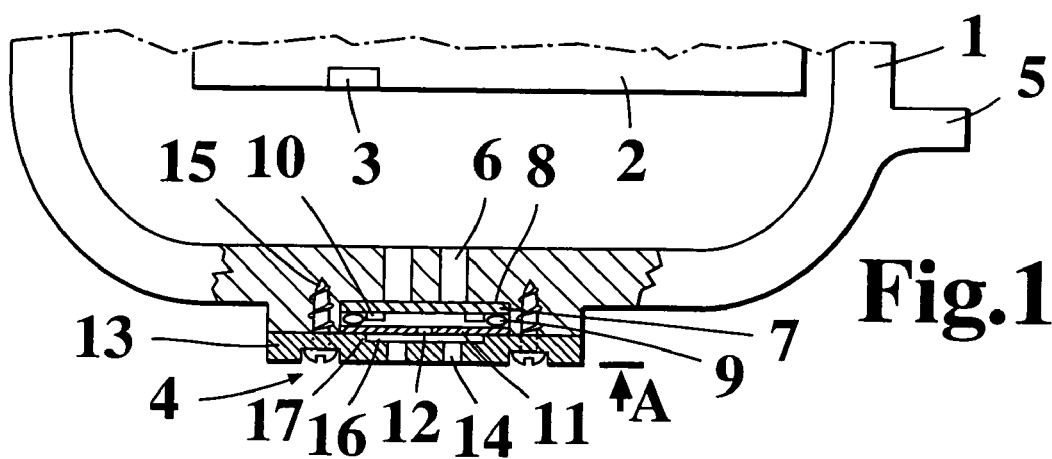
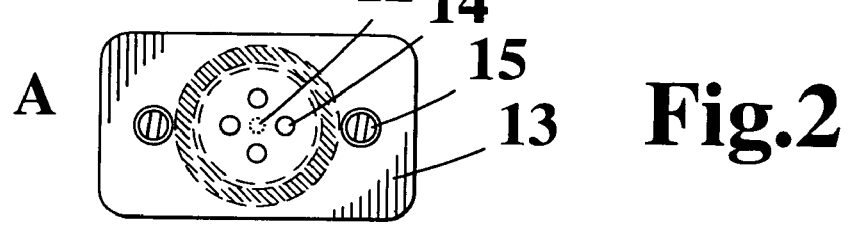
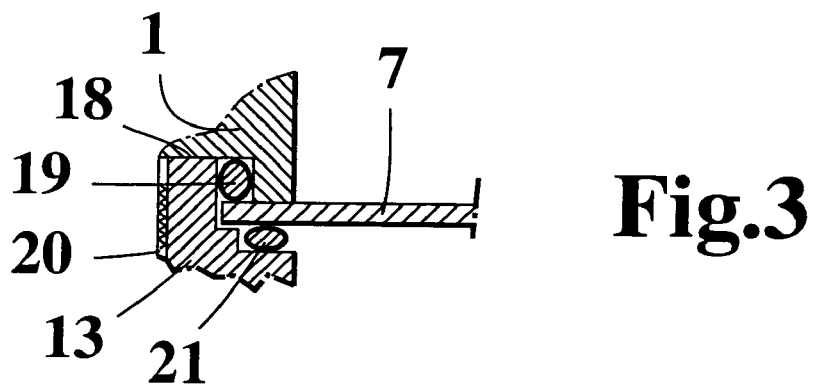
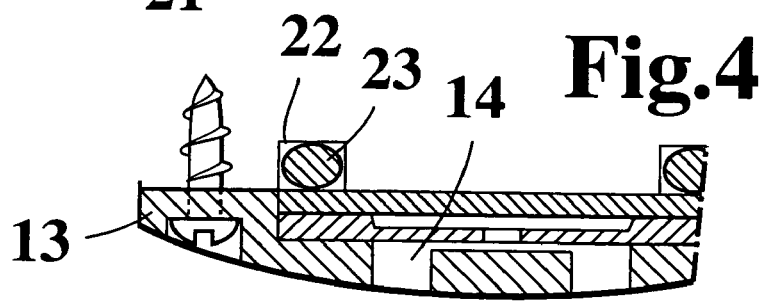
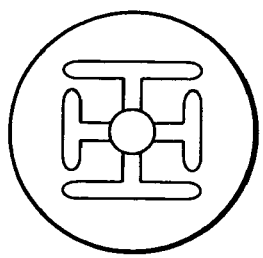

DEVICE FOR ARRANGING THE MEASUREMENT OF PRESSURE IN A WRISTOP INSTRUMENT

BACKGROUND OF THE INVENTION

The present invention relates to a device which makes it is possible to arrange for the measurement of external pressure in a wristop instrument, such as a sports computer, a diving computer, a wristwatch, or the like.

Sports computers and other light electronic devices such as GPS devices and similar, must, especially when they are intended to be worn on the wrist, be constructed in such a way that they meet the watertightness standards of the clock and watch sector. Such standards are, for example ISO 2281 and ISO 6425. The standards require products to remain watertight under water at a pressure according to a set depth. Wristop computers are usually specified as being watertight to 100 m. The test pressure is then 10 bar. Other watertightness classes used are 30 m, 70 m, and 200 m. Though the pressure class required in each case is defined according to the purpose of the device, in this connection it is important for the device to withstand the pressure under water. It may be sufficient for a device intended for light outdoor use to withstand a short immersion in water, for example, when swimming or otherwise moving in water, or for instance when washing dishes. In devices intended for more demanding use, a higher watertightness class may be necessary, only on account of the requirement for greater durability. Devices intended for diving use will of course have greater watertightness requirements, while aviation use will also place its own demands on the construction of such a device.

One way to implement pressure measurement is to use a separate pressure sensor, for which a through-hole is arranged in the body of the device. Such a through-hole is, however, expensive and takes up much space. If the device itself must be watertight, the pressure sensor can be put outside the watertight case through a sealed hole. In order to work, this construction demands complicated mechanical protection for the pressure sensor and constructions that make the case structure of the device watertight. However, these also create a thermal bridge, on which the internal moisture of the device can condense if the temperature of the bridge drops below the dewpoint of the gas inside the device.

Publication U.S. Pat. No. 6,754,137 discloses a construction, in which a piezoelectric pressure sensor is located in a wristwatch. The pressure sensor is enclosed in a space, which is connected to the environment, and which is isolated from the watertight internal space of the watch. In the solution of publication U.S. Pat. No. 4,783,772, a pressure sensor is located in a protrusion formed on the side of the case of a watch, in which there is space for the sensor and connections for transmitting a signal to the circuit board of the watch. Publication EP 1 024 034 discloses a pressure-sensor system, in which a gas-permeable membrane protects the actual sensor. In publication U.S. Pat. No. 6,016,102, a gas-selective membrane is used to seal the case of the pressure sensor, in order to be able to use the sensor in the case to measure the pressure of a specific gas.

In devices worn on the wrist, the sensor should be located in the device in such a way that it does not increase the external dimension of the device, but on the other hand also so that it does not block the path to the sensor. A location on the upper surface of the device is limited by the fact that as much of the upper surface as possible is generally required for the display. The opening or path going to the sensor can be closed using a membrane that is watertight but gas-permeable. Such membranes include those made from stretched polytetrafluoroethylene (PTFE). Known commercial names of such membranes are GORETEX™ and SYMPATEX™. The protective membrane must be well ventilated and must not be exposed to severe mechanical stress. The ventilation of the membrane is important, because, if the membrane becomes waterlogged and covered with liquid, its gas-penetrability and thus its pressure-transmission ability will be substantially reduced.

SUMMARY OF THE INVENTION

The above factors set the requirements as to how the pressure-measurement sensor is arranged in a wristop instrument.

The invention is intended to create an arrangement, with the aid of which pressure measurement can be implemented in a wristop instrument simply and reliably.

Further, at least one embodiment of the invention is intended to create an arrangement, with the aid of which it is possible to arrange the transfer of the atmospheric pressure to the pressure sensor of the instrument, and to prevent water from entering the watertight part of the instrument.

At least one embodiment of the invention is intended to create a construction, in which the components of the arrangement used for pressure measurement do not substantially increase the external dimensions of the device.

Further, at least one embodiment of the invention is intended to create a construction, in which the components of the arrangement used for pressure measurement need not be located on the surface lying against the hand, or on the same surface as the display.

The invention is based on locating the pressure sensor inside the instrument and transferring the external pressure inside the instrument and to the pressure sensor, through a gas-permeable and watertight membrane.

According to one advantageous feature of the invention, the through-hole formed by the gas-permeable membrane is sealed using at least one mechanical seal or seal construction.

According to one preferred embodiment of the invention, the gas-permeable membrane is protected against mechanical contact.

According to one preferred embodiment, the gas-permeable membrane is supported from the internal surface, using a support structure.

According to one preferred embodiment, the through-hole formed by the permeable membrane is located at the side of the instrument, in such a way that it does not open onto the surface of the instrument lying against the hand, or onto the same surface as the display.

More specifically, the arrangement according to the invention is characterized by what is stated in the characterizing portion of claim 1.

Considerable advantages are gained with the aid of the invention.

With the aid of the through-hole according to the invention, a pressure sensor can be located inside the instrument and as closely as possible to the measurement electronics, thus reducing interference. In terms of its installation and construction techniques, it is advantageous to locate the sensor on the same base as the measurement electronics. The mechanical stresses acting on the sensor will also be reduced if the sensor can be attached only to the base of the measurement electronics. With the aid of the construction, cost savings can be achieved while device can be constructed that are smaller than earlier corresponding devices. Because water vapour can move through the semipermeable membrane, moisture will be able to equalize rapidly with the external humidity and moisture will not condense inside the device. In a tightly sealed construction, the condensation of moisture inside the device when moving to a colder environment is a problem. The reduction in condensation will improve the reliability of the device.

If the through-hole formed by the gas-permeable membrane is located at the side of the instrument, the hole and its structures will not increase the external dimensions of the device. Similarly, the top surface can be used entirely for the display. In this position, the ventilation of the membrane is also very good, which will increase operating reliability. The membrane is well supported shielded by the structure and body of the instrument, so that the membrane will not be damaged by contact with, for example, an external object or great pressure. If the membrane is well supported and is made of a strong enough material, it will be possible to implement a through-hole that can withstand even the pressure class required in diving watches. Under water, the pressure cannot, of course, be measured through the watertight membrane, at least with the aid of the change in the internal pressure in the device.

BRIEF DESCRIPTION OF THE DRAWINGS

In the following, the invention is examined with the aid of examples and with reference to the accompanying drawings.

FIG. 1 shows schematically one arrangement according to the invention.

FIG. 2 shows a detail of FIG. 1.

FIG. 3 shows a detail of one embodiment of the invention.

FIG. 4 shows a second arrangement according to the invention.

FIG. 5 shows a detail of FIG. 4.

DETAILED DESCRIPTION OF THE INVENTION

In the following, some general features of the invention are examined.

The actual gas-permeable membrane, which is used, must be made sturdy and thus to some extent less permeable to gas. Poor permeability and the consequent slower pressure equalization can be compensated by increasing the surface area of the membrane.

The location of the through-hole formed with the aid of a membrane is preferably at the side of the body, but not, however, where the wristband is, so that the through-hole with its structures will not practically increase the projection surface-area of the product, but instead the greatest possible proportion of the upper surface will be available for the display of the device. A location on the bottom of the device has the drawback that the membrane will not be ventilated as effectively as at the side or on the top. The bottom of the device also forms a surface against the wrist, so that any dirt that enters between the device and the wrist, as well as detached dead skin cells, can block the through-hole in long-term use. At times the wrist may also close the opening of the through-hole. The ventilation of the membrane is of primary importance, because if the membrane becomes wet its gas permeability and pressure-transfer ability will diminish substantially. In that case, when the membrane is wet, the device will congeal enough to make the pressure measurement of the barometer or altimeter function erroneous and the data shown by the device also erroneous. On the other hand, in some products this pressure variation could be used to realize water-contact detection, particularly if it is combined with the precise measurement of temperature from the circuit board. On the other hand, if the device has a water-contact detection unit known from diving computers, the device can use it to determine that it is in water and can at least make an entry in the altimeter recording that the device is in water and thus the pressure data cannot be used.

The membrane should be ventilated, but should also be protected so that it does not become damaged when it is on the wrist of the user. The protection can be a steel mesh or two perforated plates on top of each other, between which there is an open space and the holes of which are situated so that they do not coincide with each other.

The sealing of the membrane with the body is one of the most important points of the construction. In this case, adhesive-sticker or glue solutions may not necessarily be the most advantageous. A longer period of use in outdoor conditions may spoil the seal of these solutions after some time. It would thus be advantageous to base the sealing on a mechanical seal, in such a way that there is a high-quality smooth seal surface in the body, against which a smooth seal surface in the semi-permeable membrane is pressed. In this joint, it is also possible to use a seal ring or a suitably shaped seal or an O-ring. The important point is to seal the gap between the instrument body and the gas-permeable membrane or plate in such a way that the mechanical structure creates a continuous pressure on the seal surfaces. This seal and pressure can be formed in many ways, for example, by the structures shown in the accompanying figures. Of course, a carefully implemented glue or adhesive-sticker attachment can very well be functional in some conditions.

The permeable surface area of the membrane can be, for example, 5 mm$^2$, depending on how rapid a change in pressure it is wished to monitor. Parachuting is one extreme for the most rapid measurement required, while normal trekking forms the slow measurement requirement. If the membrane is relatively large, it will have to be supported, for example, with a steel mesh or perforated plate, so that it will withstand the seal testing carried out with water pressure, as well as possibly being submerged under water, without breaking. The perforated plate can be replaced with perforation in the actual watch body, or a membrane support structure that permits pressure transmission to occur with the aid of a hole and grooving.

FIG. 1 shows one embodiment of the present invention. Inside the instrument body 1 there is the measurement electronics' circuit board 2, in which a pressure sensor 3 is set. The interior of the instrument body 1 is made to be watertight in a conventional manner, to meet the requirements of the established standards. The watertightness class is determined according to the operating purpose. A through-hole 4, implemented with the aid of a semi-permeable membrane is on the side of the instrument body 1. Thus the through-hole 4 takes up no space on the display-side surface, nor can the wrist block the through-hole on the hand-side surface. It is also preferable for the through-hole not to be situated in the area delimited by the wristband attachments 5, as this would reduce its ventilation. On the other hand, in the area between the attachments the wristband will protect the through-hole from mechanical contacts. In order to implement the through-hole itself, holes, of which there are four in this example, are made in the instrument body 1. The number, location, shape, and cross-sectional area of the hole can vary. The important factor is for the permeability of the holes and the gas-permeable membrane 7 to be sufficient to achieve a pressure-equalization speed according to the operating purpose. A flat seal surface 8, against which the gas-permeable but watertight membrane 7 is pressed, is formed in the instrument body 1, in the area surrounding the holes. The membrane 7 can be made, for example, from stretched polytetrafluoroethylene (PTFE), suitable membranes being commercially available. The parts of the membrane 7 that press against the seal surface can be at least partly surfaced with a sealing material, so that a good seal will be obtained against the seal surface 8 of the instrument body 1. The quality, roughness, and shape of the seal surface 8 must be such that watertightness is achieved between the membrane 7 and the surface. Guideline values for the manufacture of the surface can be obtained from engineering standards and handbooks, and from manufacturers' design guidelines. In this construction, it is advantageous if there can be a single seal surface while the other surfaces need not be finished in a corresponding manner. Thus in this case manufacturing costs can be kept low.

In this solution, the instrument body 1 supports the rear surface of the gas-permeable membrane 7. The membrane is protected on its opposite side to that facing the instrument body 1, using a construction such as the following. First of all lying against the membrane 7 is an O-ring 9 on the seal surface 8. With the aid of the flexible O-ring 9, a precisely defined suitable compressive force can be created against the membrane 7, which will ensure a tight joint between the membrane 7 and the sealing surface 8 in long-term use. A support ring 10 is located on the inside of the O-ring 9. A steel pressure plate 11, in which there is at least one hole 12, is fitted on top of the support ring 10 and the O-ring 9. On the very top of the construction is a cover plate 13, in which there are four holes 14. The cover plate 13 is shown from outside (from the direction A) in FIG. 2. In this case too the number, location, shape, and cross-sectional area of the holes can vary. However, the holes 12, 14 of the cover plate 13 and the pressure plate 11 should be situated in such a way that they do not coincide with each other, thus preventing a direct connection through the holes 14 of the cover plate 13 to the membrane 7. However, there must be a mutual flow connection between the holes or other openings.

The cover plate 13 is attached to the instrument body 1 by screws 15. It is obvious that the attachment can be implemented in other ways too, for instance as a threaded attachment or by riveting. There is a recess 16, which forms a space between the cover plate 11 and the pressure plate 11, in the part of the pressure plate 11 that lies against the cover plate 11. In this way, air can flow through the holes in the plates. The sealing effect of the O-ring is based on its flexibility and the compressive force forming the defined compression. In the above solution, this is created by means of the dimensioning of the recess of the cover plate 13 against the instrument body 1. The height of the edge 17 at the edges of the recess 16 and against the pressure plate 11 must be such that when the cover plate 13 is tightened by the screws 15 against the instrument body, the gap between the pressure plate 11 and the instrument body 1 creates sufficient compression in the O-ring. Here, the purpose of the support ring 10 is to delimit the space of the O-ring, so that it will remain the correct shape and the desired amount of compression is created. O-ring manufacturers provide dimensioning guidelines for the installation of the rings.

In the embodiment of FIG. 3, a fiber fabric is used to support the gas-permeable membrane 7 and a single large through-hole opening can be made in the instrument body. The fiber fabric is situated on the interior side of instrument body 1. This is important because the fiber fabric will then be protected inside from becoming wet and cannot become saturated and dirtied. The collection of water or dirt on the fiber fabric would prevent the membrane from breathing.

In the solution of FIG. 3, two-part O-ring sealing is used. An installation groove 18, into which the edge 19 of the cover plate 13 and the first O-ring 19 on the inner side of the edge fit, is formed in the instrument body 1 for the sides of the membrane 7. In this solution, the cover plate can be attached to the instrument body 1 by means of threads 20 formed in the edges of the installation groove 18 and in the outer surface of the cover plate 13. There is a second installation groove in the surface of the cover plate 13 facing the membrane 7, for a second O-ring 20. This O-ring can be supported from its inner surface by a support ring, or by the shape of the cover plate 13. The protection of the membrane from contact can be implemented in the manner described above, or for instance by a suitably dense protector mesh. Instead of a threaded attachment, an adhesive, a lock ring, or other conventional attachment solutions can be used to attach the cover plate.

In the solutions shown in FIG. 4, the edges of the gas-permeable membrane 7 on the instrument-body side are seals by means of an O-ring located in the installation groove 22. In this solution, crosswise H-shaped grooves (FIG. 5) are formed in the pressure plate 11, one on each side of plate 11. The grooves do not run through the plate, instead there is a hole in the plate at the intersection of the bottoms of the grooves. The plate now presses from a large surface against the membrane 7, but the surface area lying against the membrane is also large. Naturally, the H-groove on the surface facing the cover plate 13 must at least partly coincide with the holes 14 of the cover plate 13. It is possible to use a similar type of construction in the surface of the instrument body 1 facing the membrane 7, in which case relatively good support will be achieved, without compromising with a sufficiently small flow resistance. It is obvious that the grooving of the pressure plate 11 facing the membrane must at least partly correspond to the grooving in the instrument body. The shape of the grooving can of course vary. Alternatively, the grooving can be only in the instrument body. In this solution too, there is also only surface to be sealed, which is formed between the O-ring and the rear surface of the membrane. In this case, the surface of the membrane facing the seal must be treated in such a way that a sufficient seal is achieved. The membrane can, for example, have impermeable edges and be surfaced with a material that provides sufficient smoothness.

The invention can be implemented with the aid of many different kinds of constructional solutions. Similarly, materials such as metals, metal alloys, polymers, composite materials, and ceramics, which are widely used in the manufacture of instruments, can be used as the materials. The only limitation regarding the selection of the material is that the membrane must be permeable by a gas, but nevertheless watertight. Thus a material must be used as the membrane, in which it is possible to form a porosity and thickness that meets this requirement.

The term flow path can be used generally for the openings or holes in the instrument body, the cover plate, the pressure plate, and elsewhere in the structure.

The invention claimed is:

1. A device for measuring pressure in a wristop instrument, which comprises
    an instrument body which defines at least one watertight space therein,
    at least one circuit board disposed in the watertight space,
    at least one flow path which extends through the instrument body for communication with the watertight space,
    at least one membrane which watertightly closes the flow path said membrane being permeable to gas, but not by water, and
    a pressure sensor disposed in the same watertight space as that of the at least one circuit board.

2. The device according to claim 1, wherein the pressure sensor is situated on the circuit board in said watertight space.

3. The device of claim 1, wherein the gas-permeable membrane is sealed to the instrument body by at least one seal structure in which the seal is based on compression between the seal surfaces.

4. The device according to claim 3, wherein the seal structure comprises a seal surface formed in the instrument body and against which the gas-permeable membrane is pressed.

5. The device according to claim 3, wherein the seal structure comprises at least one seal element, at least one surface of which presses against the surface of the membrane.

6. The device according to claim 1 wherein support elements are provided for supporting the gas-permeable membrane from its side facing the watertight space.

7. The device according to claim 6, wherein the support elements form a component that presses the instrument body against the membrane.

8. The device according to claim 6, wherein the support elements include a fiber fabric fitted on the side of the watertight space.

9. The device according to claim 1, characterized in that the permeable membrane is protected mechanically from contact.

10. The device according to claim 9, wherein the permeable membrane is protected mechanically from contact by forming a flow path that runs from outside the instrument body to the membrane, in such a way that a direct contact connection is prevented.

11. The device according to claim 9, wherein the permeable membrane is protected mechanically from contact by means of a dense mesh structure.

12. The device according to claim 1 wherein at least one flow path is situated on the side of the instrument body, in such a way that it does not open onto a surface of the body lying against the hand, or onto the same surface as a display.

13. The device of claim 1, said device compressing a wristop instrument.

14. A watertight electronic device which comprises
a housing which defines a watertight chamber,
electronic components of the electronic device disposed on the watertight chambers,
a pressure sensor disposed in the watertight chamber,
a flow path disposed in the housing for providing communication between housing and the environment outside the housing, and
a membrane which watertightly closes the flow path, said membrane being permeable to gas but not permeable to water, whereby the pressure outside the device can be transferred to the pressure sensor inside the device while preventing water from entering the watertight chamber.

\* \* \* \* \*